(12) United States Patent
Harada (10) Patent No.: US 9,704,072 B2
(45) Date of Patent: Jul. 11, 2017

(54) PRINTER, METHOD, AND PROGRAM FOR PRINTING ARABIC CHARACTERS

(71) Applicant: TOSHIBA TEC KABUSHIKI KAISHA, Tokyo (JP)

(72) Inventor: Noriaki Harada, Nagaizumi Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/867,405

(22) Filed: Sep. 28, 2015

(65) Prior Publication Data

US 2017/0091599 A1   Mar. 30, 2017

(51) Int. Cl.
*G06K 15/00* (2006.01)
*G06K 15/02* (2006.01)

(52) U.S. Cl.
CPC ....... *G06K 15/1842* (2013.01); *G06K 15/022* (2013.01); *G06K 15/1802* (2013.01); *G06K 15/1817* (2013.01); *G06K 15/1831* (2013.01)

(58) Field of Classification Search
None
See application file for complete search history.

(56) References Cited

U.S. PATENT DOCUMENTS

| | | | | |
|---|---|---|---|---|
| 5,050,098 A * | 9/1991 | Brown, III | ............. | G06K 15/00 358/1.13 |
| 2004/0059998 A1* | 3/2004 | Palmieri | ............. | G06F 17/2863 715/265 |
| 2009/0110275 A1* | 4/2009 | Ahmed | ............. | G06F 17/30707 382/170 |
| 2009/0244164 A1* | 10/2009 | Nakamaki | ............. | B41J 2/16579 347/19 |
| 2011/0298850 A1* | 12/2011 | Ochiai | ................. | G06K 15/107 347/9 |

FOREIGN PATENT DOCUMENTS

| | | |
|---|---|---|
| JP | S57-176167 | 10/1982 |
| JP | H05-193085 | 8/1993 |
| JP | 2011-243201 | 12/2011 |

* cited by examiner

*Primary Examiner* — John Wallace
(74) *Attorney, Agent, or Firm* — Patterson & Sheridan, LLP (57) ABSTRACT

A printer according to an embodiment includes an interface that receives Arabic character data. A control portion includes an image buffer that stores the Arabic character data and a character generator that stores font data corresponding to the Arabic character data. The control portion retrieves font data from the character generator corresponding to the Arabic character data. The control portion generates at least one Arabic character string corresponding to a line or a word unit by rearranging the Arabic character data. The control portion generates image data of the Arabic character string based on the font data. A printer engine prints the generated image data.

14 Claims, 6 Drawing Sheets

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0627h | 0643h | 062Ah | 0634h | 0627h | 0641h | 0020h | 0627h | 0644h | 0642h | 0645h | 0631h | 0020h | 0627h | 0644h |
| | ا | ك | ت | ش | ا | ف | | ا | ل | ق | م | ر | | ا | ل |
| B | 0640h | 0020h | 0031h | 0034h | 0020h | 062Dh | 0648h | 0644h | 0020h | 0643h | 0648h | 0643h | 0628h | 0020h | 0646h |
| | ـ | | ١ | ٤ | | ح | و | ل | | ك | و | ك | ب | | ن |
| C | 064Ah | 0628h | 062Ah | 0648h | 0646h | | | | | | | | | | |
| | ي | ب | ت | و | ن | | | | | | | | | | |

| 0033h | 0043h | 0063h | LF, CR, |
|-------|-------|-------|---------|
| 3 | C | c | |
| 0032h | 0042h | 0062h | LF, CR, |
| 2 | B | b | |
| 0031h | 0041h | 0061h | LF, CR, |
| 1 | A | a | |

| 0627h | 0647h | 0627h | LF, CR |
|-------|-------|-------|--------|
| ا | ه | ا | |
| 0643h | 0644h | 0644h | LF, CR |
| ك | ل | ل | |
| 062Ah | 0020h | 0639h | LF, CR |
| ت |   | ع | |
| 0634h | 062Ah | 062Bh | LF, CR |
| ش | ت | ث | |
| 0627h | 0628h | 0648h | LF, CR |
| ا | ب | و | |
| THE REST IS OMITTED | | | |

PRINTER, METHOD, AND PROGRAM FOR PRINTING ARABIC CHARACTERS

FIELD

Embodiments described herein relate generally to a printer that prints Arabic characters appropriately in a vertical direction with respect to a transport direction of a sheet.

BACKGROUND

In the related art, a printer may print vertically by rotating a string of characters, such as Latin alphabet letters or Chinese characters. There is also a printer that prints vertically in a direction perpendicular to a transport direction of a sheet having a roll shape.

For printing Arabic characters, in a case of printing in a vertical direction with respect to the transport direction of a sheet, an order of character data transmitted from a host to the printer is rearranged from right to left, by a word unit or a line unit. Furthermore, processing is executed to generate an image of the Arabic character string which converts a character into a character having the appropriate shape, in accordance with a position of the character in the word. The processing also generates image data in which characters are connected to each other in shape. Thereby, the appropriate Arabic characters may be printed.

For example, in the printing of a check, a printing line is in the same direction as the transport direction of the sheet. In this case, the character is rotated at an angle of 90 degrees (or 270 degrees clockwise) by one character unit. Generally, in the case of alphanumeric characters, even if the character data string is printed in order of reception, an output is correctly printed in the vertical direction.

However, in the case of the Arabic character string, a matrix is replaced, when printing is performed in order of transmission of the character data which is transmitted from an application or a driver. Therefore, if the processing is performed to generate the image of the Arabic character string in order of reception of the character data, there is a problem that an unnatural Arabic character which is different from the output intended by the host side is inappropriately printed.

DETAILED DESCRIPTION

Embodiments described herein provide a printer that prints Arabic characters appropriately in a vertical direction with respect to a transport direction of a sheet.

A printer according to an embodiment includes an interface that receives Arabic character data. A control portion includes an image buffer that stores the Arabic character data and a character generator that stores font data corresponding to the Arabic character data. The control portion retrieves font data from the character generator corresponding to the Arabic character data. The control portion generate at least one Arabic character string corresponding to a line or a word unit by rearranging the Arabic character data. The control portion generates image data of the Arabic character string based on the font data. A printer engine prints the generated image data.

Hereinafter, embodiments will be described in detail with reference to the drawings.

First Embodiment

Figure 1:
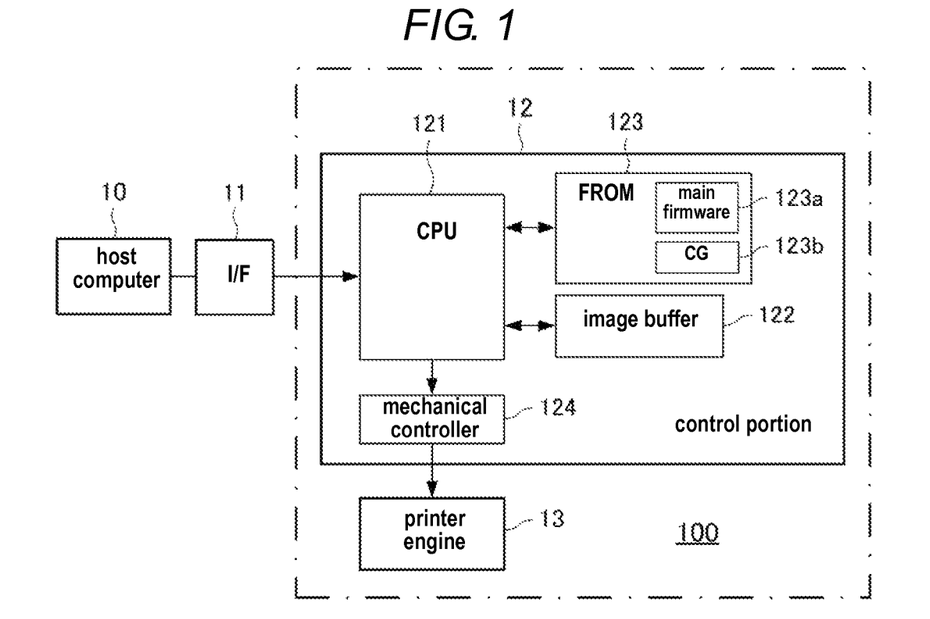
FIG. 1 is a block diagram illustrating components of a printer according to a first embodiment.

FIG. 1 is a block diagram illustrating components of a printer according to a first embodiment.

In FIG. 1, a reference numeral 100 denotes a printer, and a reference numeral 10 denotes a host computer that transmits character data and a control command to the printer 100. The printer 100 is connected to the host 10 through an interface (I/F) 11, which receives the character data. The host 10 is, for example, a PC (Personal Computer) or the like. The host 10 may transmit a printing instruction and the character data to the printer 100. The printer 100 includes a control portion 12, a printer engine 13, and the like.

The control portion 12 includes a CPU (Central Processing Unit) 121, an image buffer 122, a FROM (Flash Read Only Memory) 123 including an area of a main firmware 123a and a character generator (CG) 123b, a mechanical controller 124, and the like.

The CPU 121 controls various types of processing in the printer 100. The CPU 121 is also in charge of controlling the firmware which is stored in the main firmware 123a and reading font data which is stored in the character generator 123b.

The image buffer 122 is, for example, a RAM (Random Access Memory), and temporarily stores the character data or the like.

The FROM 123 stores various parameters which are used in an operation control of the printer 100 and data relating to registration of the printer 100. The main firmware 123a of the FROM 123 includes functions for control of the whole printer 100. Furthermore, the main firmware 123a reads the font data from the character generator 123b in which the font data is stored.

The CPU 121 controls the mechanical controller 124. The mechanical controller 124 drives the printer engine 13 that performs the printing based on the character data read from the character generator 123b. A printing head is mounted on the printer engine 13. The printer engine 13 includes a carriage for performing main scanning, a feed mechanism for transporting a sheet, and the like.

In addition, the FROM 123 may not necessarily be the only type of storage device used. Other types of other storage mediums may be used, including an optical medium (for example, a Digital Versatile Disc (DVD)) or a magnetic medium (for example, a HDD). Moreover, an electrical medium (for example, a Solid State Device (SSD)) or the like may be used.

Figure 2A:
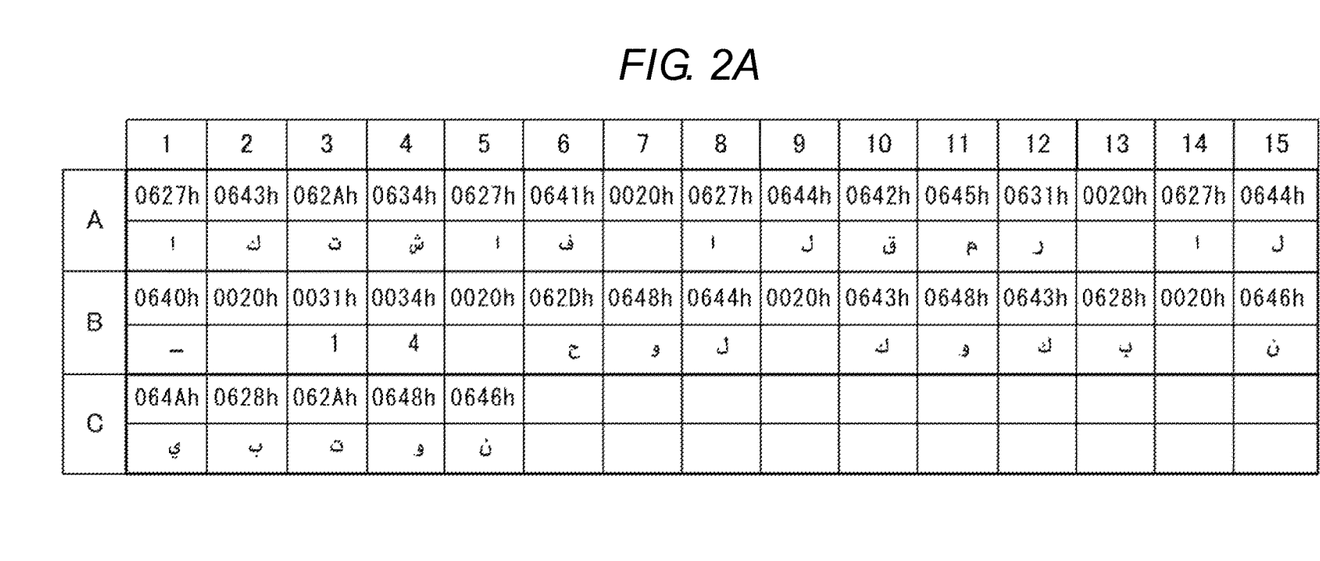
FIG. 2A is a diagram illustrating input codes, according to the first embodiment.
Figure 3A:
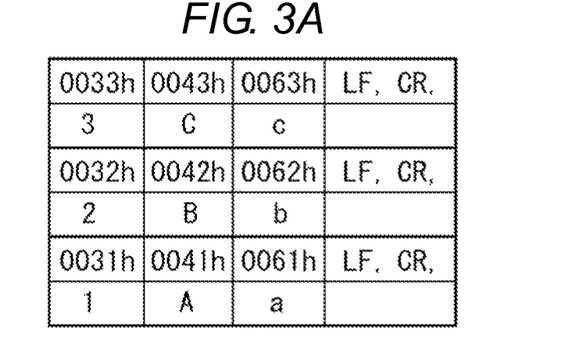
FIG. 3A is a diagram illustrating input codes according to a second embodiment.
Figure 4A:
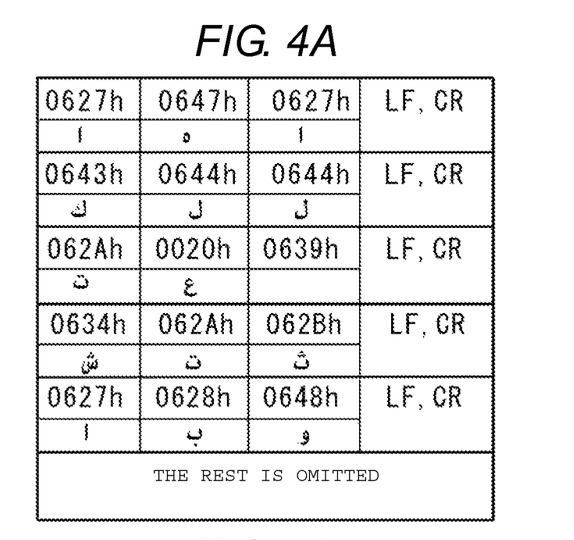
FIG. 4A is a diagram illustrating input codes, according to a third embodiment.

FIG. 2A, FIG. 3A and FIG. 4A illustrate examples of the character data transmitted from the host 10, respectively. Additionally, Unicode, which is an international standard, is used in the character data. The characters corresponding to the character data illustrated in FIG. 2A and FIG. 4A are Arabic characters. The characters corresponding to the character data which is illustrated in FIG. 3A, are Latin alphabet characters.

Figure 2B:
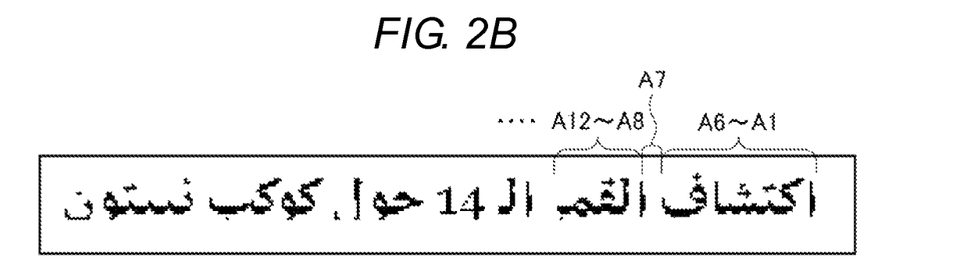
FIG. 2B illustrates a printing example based on the input codes in FIG. 2A.
Figure 3B:
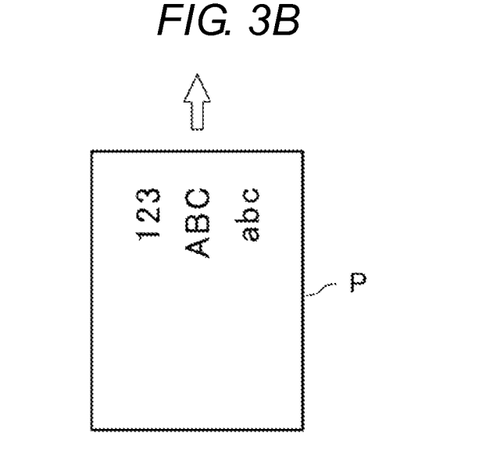
FIG. 3B illustrates a printing example based on the input codes in FIG. 3A.
Figure 4B:
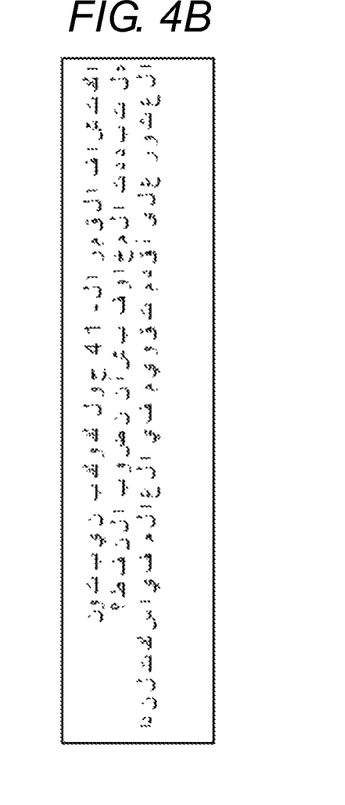
FIG. 4B illustrates a printing example based on the data of the input code in FIG. 4A.

Furthermore, FIG. 2B illustrates a printing example based on the character data in FIG. 2A. FIG. 3B illustrates a printing example based on the character data in FIG. 3A. FIG. 4B illustrates a printing example based on the character data in FIG. 4A.

First, in the example illustrated in FIG. 2A, character data having an amount of one page of A1 to A15→B1 to B15→C1 to C5, is sequentially transmitted from the host 10 to the printer 100. The character data is stored in the image buffer 122, as the amount of one page, for example. The control portion 12 reads the font data corresponding to the character data which is stored in the image buffer 122 from the character generator 123b, and converts the font data into converted character data. The control portion 12 generates the Arabic characters as a word unit, based on the converted character data. The control portion 12 generates the Arabic characters as image data. The generated image data is transmitted to the printer engine 13, and the printing thereof on the sheet is performed.

The character data which is illustrated in FIG. 2A, corresponds to the Arabic characters. In the character data, a line feed LF and a carrier return CR are not included. That is, information of the carrier return CR which backs a carrier of the sheet, and the information of the line feed LF which starts a new line, are not included. Accordingly, the printing of the character data which is transmitted, is simply the printing which is illustrated in FIG. 2B.

The character data which is illustrated in FIG. 3A, corresponds to Latin alphabet characters. In the character data, the line feed LF and the carrier return CR are included at the end of the line. A command which rotates the character at the angle of 270 degrees clockwise is also included in the character data but is not illustrated in FIG. 3A. As a rotation command, other angles of 90 degrees clockwise or the like, may be used.

As illustrated in FIG. 3B, the printing of the character data which is transmitted starts a new line with three characters per one line. In this case, the characters which are printed in a first line to a third line are [3 C c], [2 B b] and [1 A a], respectively. Each character is rotated at the angle of 270 degrees clockwise, and thereby the normal printing may be achieved in a direction perpendicular to the transport direction of a sheet P shown with an arrow in the drawing.

In the same manner as in FIG. 3A, the character data illustrated in FIG. 4A includes the line feed LF and the carrier return CR at the end of the line of the Arabic characters. The command which rotates the character at the angle of 270 degrees clockwise is also included in the character data but is not illustrated in FIG. 4A. As a rotation command, other angles of 90 degrees clockwise or the like, may be used.

In the example, the character data which is transmitted, is the character data corresponding to three characters per one line, for example, [0627h 0647h 0627h]. Following each line, the line feed LF, the carrier return CR, and the rotation command are performed, and the character data corresponding to one page is stored in the image buffer 122. The control portion 12 reads the font data corresponding to the character data which is stored in the image buffer 122 from the character generator 123b, and converts the font data into the character data. The control portion 12 performs the processing of generating the Arabic characters as a word unit, based on the character data which is converted. The control portion 12 generates the Arabic characters as image data. The generated image data is transmitted to the printer engine 13, and the printing which is illustrated in FIG. 4B is performed.

Incidentally, the printed Arabic characters are made by first rotating the characters transmitted from the host 10 and then performing the printing thereof. However, if the Arabic character string is first generated from the character data, and then the image data is created, the result of the printing is different from the output intended and illustrated in FIG. 4B. In other words, only one character is rotated at the angle of 270 degrees clockwise.

Therefore, even if the Arabic characters are printed perpendicular to the transport direction of the sheet, the printer 100 achieves printing of the normal Arabic characters.

Figure 5:
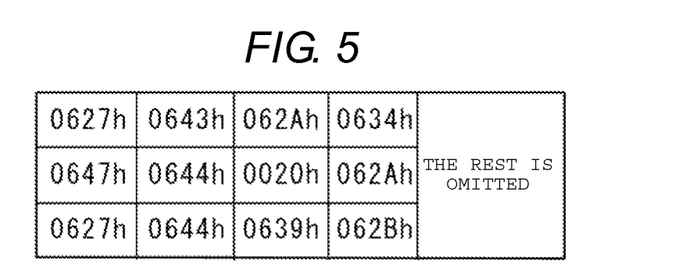
FIG. 5 is a diagram illustrating a rearrangement of the input codes in FIG. 4A.

Specifically, in the printer 100, the character data which is transmitted from the host 10 (for example, the character data which is illustrated in FIG. 4A) is stored in the image buffer 122, for example, as the amount of one page. The control portion 12 then converts a matrix of the stored character data into rearranged character data as illustrated in FIG. 5. The control portion 12 generates the Arabic character string one line or word unit at a time, with the character data which is converted. The image data which is generated is then rotated at the angle of 90 degrees or 270 degrees clockwise, and is printed. Thereby, the normal Arabic characters may be vertically printed.

Furthermore, the relationship between the character data transmitted from the host 10 and the printing of the printer 100 which is described in FIGS. 2A, 2B, 3A, 3B, 4A and 4B, is set in advance upon shipping, in accordance with an intended destination or use thereof.

Figure 6:
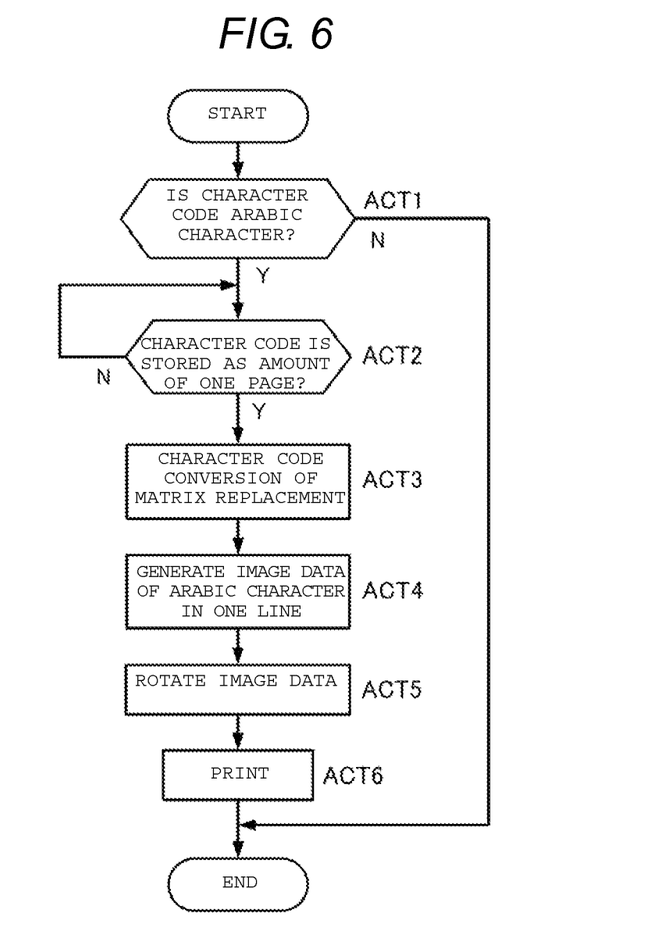
FIG. 6 is a flow chart illustrating operations of the printer according to the first embodiment.

Moreover, FIG. 6 is a flowchart illustrating operations of the printer according to the first embodiment. The flowchart illustrates the steps for printing the character data vertically in the direction perpendicular to the transport direction of a printing sheet, if the character data which is transmitted from the host 10 is Arabic characters.

The control portion 12 determines whether the character data which is transmitted from the host 10 through the interface 11 is the Arabic character (ACT1).

The control portion 12 stores the character data in the image buffer 122, and determines whether the character data which is stored reaches the amount of one page (ACT2).

In ACT2, if the operation that stores the character data of the amount of one page is finished (Yes), the character data is converted so that the matrix of the character data is rearranged in a preprogrammed procedure (ACT3).

For example, the character data is processed by rearranging the character data in a column direction of FIG. 4A into a two-dimensional array of the code in a line direction, as illustrated in FIG. 5. The control portion 12 preserves the rearranged character data in the image buffer 122.

The rearrangement of the character uses the carrier return CR included at the end of the line of the character data as a mark. That is, [0627h 0643h 062Ah . . . ] of the character data in a first column from the left of FIG. 4A, is rearranged into [0627h 0643h 062Ah . . . ] of the character data in the first line of FIG. 5. Further, [0647h 0644h 0020h . . . ] of the character data in a second column from the left of FIG. 4A, is rearranged into [0647h 0644h 0020h . . . ] of the character data in the second line of FIG. 5. Likewise, [0627h 0644h 0639h . . . ] of the character data in a third column from the left of FIG. 4A, is rearranged into [0627h 0644h 0639h . . . ] of the character data in the third line of FIG. 5.

The control portion 12 reads the character data from the character generator 123b, and generates the image data of the Arabic characters, based on the character data per each line which is rearranged (ACT4).

Figure 7:
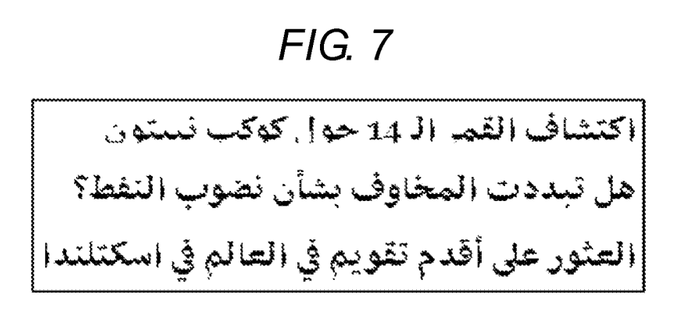
FIG. 7 illustrates output data based on the input codes in FIG. 6.

The control portion 12 rotates the image data of the Arabic characters (which was generated from the character generator 123b and illustrated in FIG. 7) at the angle of 270 degrees clockwise, in accordance with the rotation command (ACT5).

Figure 8:
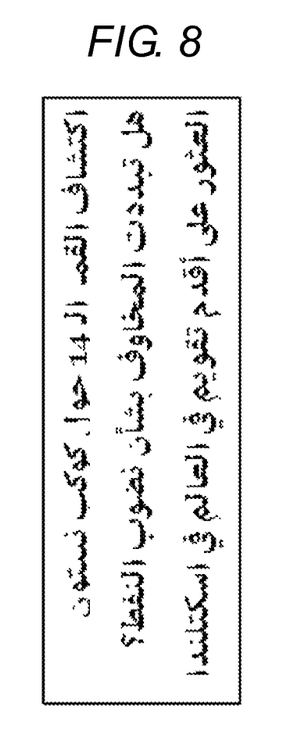
FIG. 8 illustrates a printing example based on the output data in FIG. 7.

Then, the control portion 12 drives the printer engine 13 through the mechanical controller 124, and performs the printing of the normal Arabic characters vertically in the direction perpendicular to the transport direction of the sheet as illustrated in FIG. 8 (ACT6).

The printer 100 that receives the character data corresponding to the Arabic characters as illustrated in FIG. 4A, may achieve the printing of the normal Arabic characters vertically in the direction perpendicular to the transport direction of the sheet, by passing through the processing of ACT1 to ACT6 described above.

In the embodiment, the character data which is transmitted from the host 10 is stored as a matrix corresponding to one page, and the matrix is converted into the rearranged character data. The image data which is generated through the processing of generating the Arabic character string by one line or a word unit with the converted data, is rotated at the angle of 90 degrees or 270 degrees clockwise, and the printing is performed. Thereby, the character data may be correctly printed in the vertical direction.

Second Embodiment

In the first embodiment, the printing relationship between the character data transmitted from the host 10 and the printer 100 is set in advance upon shipping, in accordance with the intended destination or use thereof. According to a second embodiment, the printer 100 is capable of the printing of FIG. 2B, FIG. 3B and FIG. 4B, for example, regardless of the character data which is transmitted from the host 10. The printer according to the second embodiment includes at least a plurality of functions, and is capable of switching manually or automatically.

For example, a key that switches the printing is prepared in a main body of the printer 100 in advance, and the manual switching is achieved through input from a user. Furthermore, the switch may be stored as a setting which may be maintained when starting up a power source of the printer 100, so that the switch does not have to be manually input each time.

Moreover, the automatic setting switching may be performed, for example, based on the character rotation command which is transmitted from the host 10, as the switching information. That is, based on character data, which includes the rotation command and which is transmitted from the host 10, conversion of the character data which is rearranged as illustrated in FIG. 5, is performed. The processing of generating the Arabic character string by one line or a word unit, is performed with the converted character data. The obtained image data is rotated based on the rotation command. The rotation angle is 90 degrees or 270 degrees, clockwise. The printer engine 13 then prints the rotated image data as the normal Arabic characters which are rotated with respect to the sheet.

In the embodiment, the printer may print characters other than Arabic characters, and may also print normal Arabic characters by switching the character which is vertically written in the direction perpendicular to the transport direction of the sheet.

In the embodiments described above, although the memory that stores the character data corresponding to one page is used, a memory that stores the character data corresponding to a plurality of pages may be used. In addition, if the sheet is a roll sheet, a page unit may be determined by setting a cut command included in the character data as a delimiter of the page while considering the cut command as one page.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer comprising:
an interface through which character data to be printed are received;
an image buffer in which character data received through the interface are stored;
a memory region in which font data corresponding to Arabic character data are stored;
a central processing unit configured to store the character data received through the interface in rows and columns, determine whether or not the character data received through the interface are Arabic character data, and upon determining that the character data received through the interface are Arabic character data: (i) transpose the rows and columns of the Arabic character data, (ii) retrieve font data corresponding to the Arabic character data from the memory region, (iii) after transposing the rows and columns, generate an Arabic character string for each row of the Arabic character data, and (iv) generate image data of each Arabic character string based on the font data; and
a printer engine configured to print the generated image data.

2. The printer according to claim 1, wherein the central processing unit rotates the generated image data prior to printing based on rotation information included in the Arabic character data.

3. The printer according to claim 1, wherein the generated image data includes line spacing based on information of at least a line feed and a carrier return that is included in each row of the Arabic character data.

4. The printer according to claim 2, wherein a rotation angle of the generated image data is 90 degrees or 270 degrees, clockwise or counterclockwise.

5. The printer according to claim 1, wherein the character data stored in the image buffer corresponds to one page.

6. The printer according to claim 5, wherein when the printer engine prints on a roll sheet, the one page is determined by a cut command included in the received character data.

7. A method of printing Arabic characters, the method comprising the steps of:
- receiving character data;
- storing the received character data in a buffer in rows and columns;
- determining whether or not the character data stored in the buffer are Arabic character data;
- upon determining that the character data stored in the buffer are Arabic character data: (i) transposing the rows and columns of the Arabic character data, (ii) retrieving font data corresponding to the Arabic character data, (iii) after transposing the rows and columns, generating an Arabic character string for each row of the Arabic character data, and (iv) generating image data of each Arabic character string based on the font data; and
- printing the generated image data.

8. The method according to claim 7, wherein the generated image data is rotated prior to printing based on rotation information included in the Arabic character data.

9. The method according to claim 7, wherein the generated image data includes line spacing based on information of at least a line feed and a carrier return that is included in each row of the Arabic character data.

10. The method according to claim 8, wherein a rotation angle of the generated image data is 90 degrees or 270 degrees, clockwise or counterclockwise.

11. The method according to claim 7, wherein the character data stored in the buffer corresponds to one page.

12. The method according to claim 11, wherein the image data is printed on a roll sheet and the one page is determined by a cut command included in the received character data.

13. A non-transitory computer readable medium containing instructions causing a printer to perform the steps of:
- receiving character data;
- storing the received character data in a buffer in rows and columns;
- determining whether or not the character data stored in the buffer are Arabic character data;
- upon determining that the character data stored in the buffer are Arabic character data: (i) transposing the rows and columns of the Arabic character data, (ii) retrieving font data corresponding to the Arabic character data, (iii) after transposing the rows and columns, generating an Arabic character string for each row of the Arabic character data, and (iv) generating image data of each Arabic character string based on the font data; and
- printing the generated image data.

14. The non-transitory computer readable medium according to claim 13, wherein the generated image data is rotated prior to printing based on rotation information included in the Arabic character data.

* * * * *